June 3, 1930.   B. M. SHIPLEY   1,761,644
CASH REGISTER
Filed May 24, 1926   2 Sheets-Sheet 1

Inventor
Bernis M. Shipley
By Carl Benst
Henry E. Stauffer
His Attorneys

June 3, 1930.   B. M. SHIPLEY   1,761,644
CASH REGISTER
Filed May 24, 1926   2 Sheets-Sheet 2
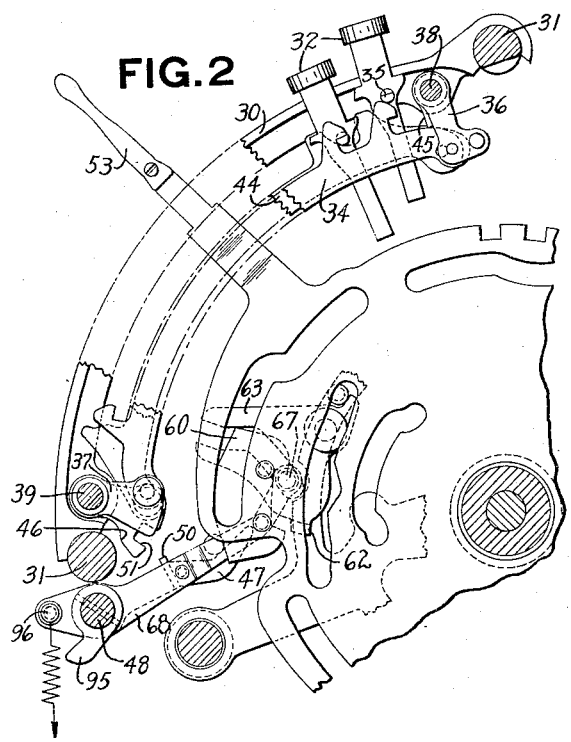
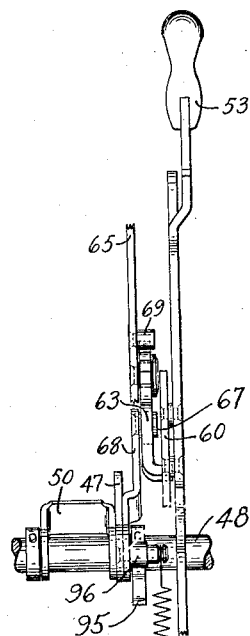
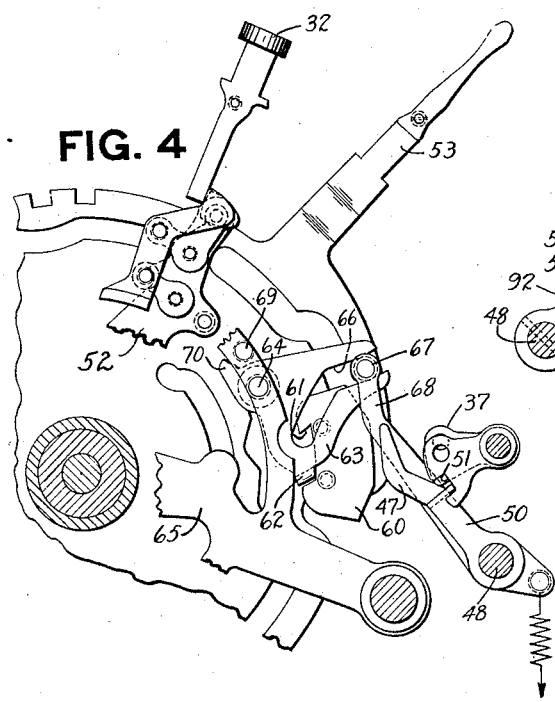
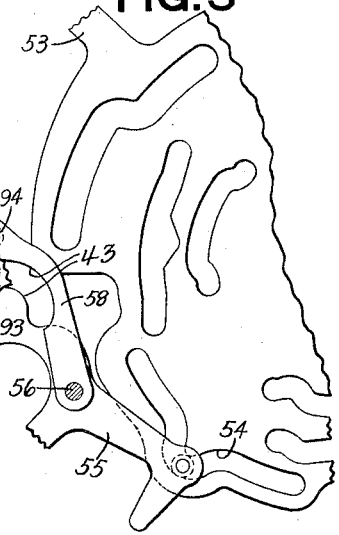
Inventor
Bernis M. Shipley
His Attorneys Patented June 3, 1930

1,761,644

UNITED STATES PATENT OFFICE

BERNIS M. SHIPLEY, OF DAYTON, OHIO, ASSIGNOR TO THE NATIONAL CASH REGISTER COMPANY, OF DAYTON, OHIO, A CORPORATION OF MARYLAND

CASH REGISTER

Application filed May 24, 1926. Serial No. 111,308.

This invention relates to cash registers and like machines, and more particularly to the type of machine shown in Letters Patent of the United States, No. 1,230,864, issued to W. A. Chryst on June 26, 1917, and Nos. 1,242,170 and 1,394,256, issued to F. L. Fuller on October 9, 1917 and October 18, 1921, respectively, and in an application for Letters Patent of the United States, Serial No. 687,305, filed by B. M. Shipley on January 19, 1924.

Machines of the type set forth in the above-mentioned patents and application, are extensively used in "cash and carry" businesses, wherein the customers themselves inspect the stock and select the articles of merchandise desired.

After making their selections, the customers carry the goods selected to a counter where a clerk enters the price of the goods selected on a register, and the customer pays the total amount for his purchases.

The majority of sales are of a plurality of articles, i. e., the customer selects several articles which he wishes to purchase, and as one means to handle transactions of this nature, known as "multiple item transactions," it is convenient to provide the register with two totalizers, one of which accumulates a grand total of all the sales, the remaining totalizer being adapted to accumulate the various items of each multiple item transaction or sale, whereby the clerk and the customer may be informed of the total amount due.

In using a register so equipped, in a multiple item transaction, the clerk sets up and enters in the machine the prices of the various articles selected by a customer, which price amounts are printed successively on a paper strip issuing from the machine. When all the amounts for the various articles have been entered, the clerk by a total-taking operation prints the total amount at the foot of the list of items and clears the totalizer preparatory to waiting upon the next customer.

In order to take care of customers in the shortest possible time, with accuracy and despatch, especially when there is a rush, it is desired to facilitate the operation of listing and totaling multiple item purchases as much as possible, particularly as the large majority of transactions are of this kind.

But the machine disclosed in the Shipley application, Serial No. 687,305, above mentioned, on which the present invention is an improvement, permits several different adjustments of the total lever, to obtain different results.

Thus, in the machine of Shipley application, Serial No. 687,305, the total lever, which is normally in the adding position intermediate its limits of travel, may be shifted to any one of three positions below its normal adding position, and to either of two positions above its adding position.

Obviously a clerk using this machine might accidentally shift the total lever to the wrong position in his anxiety to serve a rush of customers in the shortest possible time, and it is the object of the present invention to so arrange the machine that the operator, no matter how hurried, can only shift the total lever to the one single proper position, when using the machine in multiple item transactions.

Naturally, this result might be obtained in several different ways, as by permanently closing the slot in the keyboard along which the total lever travels, so as to provide but two possible positions which the total lever could occupy, namely, the normal adding position, and the total-taking position for multiple item transactions, but such a procedure would prevent the machine from being used for the many other purposes for which it is adapted.

Therefore, I have conceived the idea of so arranging the mechanism that the clerk, when setting the machine for a multiple item transaction, automatically and incidentally to such setting, adjusts mechanism which will prevent any other than the proper operation of the total lever from its adding position to its total-taking position.

By this contrivance, the multiple uses to which the machine may be put are not interfered with, but the machine is so constructed that, when employed to enter multiple items and obtain a total thereof, it cannot be used in any but the proper manner.

In short, means is provided which will insure that the clerk shall shift the total control member to total printing and clearing position, whereby the total will be printed and the multiple item totalizer cleared, and the transaction closed, before he can proceed with another transaction.

With this and incidental objects in view, the invention includes certain novel features and combinations of parts, the essential elements of which are set forth in appended claims and a preferred form or embodiment of which is hereinafter described with reference to the drawings which accompany and form part of this specification.

Of said drawings:

Fig. 2 is a right side view of a portion of the total lever and transaction key bank, together with their interlocking mechanism.

Fig. 3 is a front view of the total lever and interlocking mechanism.

Fig. 4 is a left side view of the total lever and amount key interlocking mechanism.

Fig. 5 is a right side view of a portion of the total control lever and some of the mechanism it controls.

Transaction keys

Figure 1:
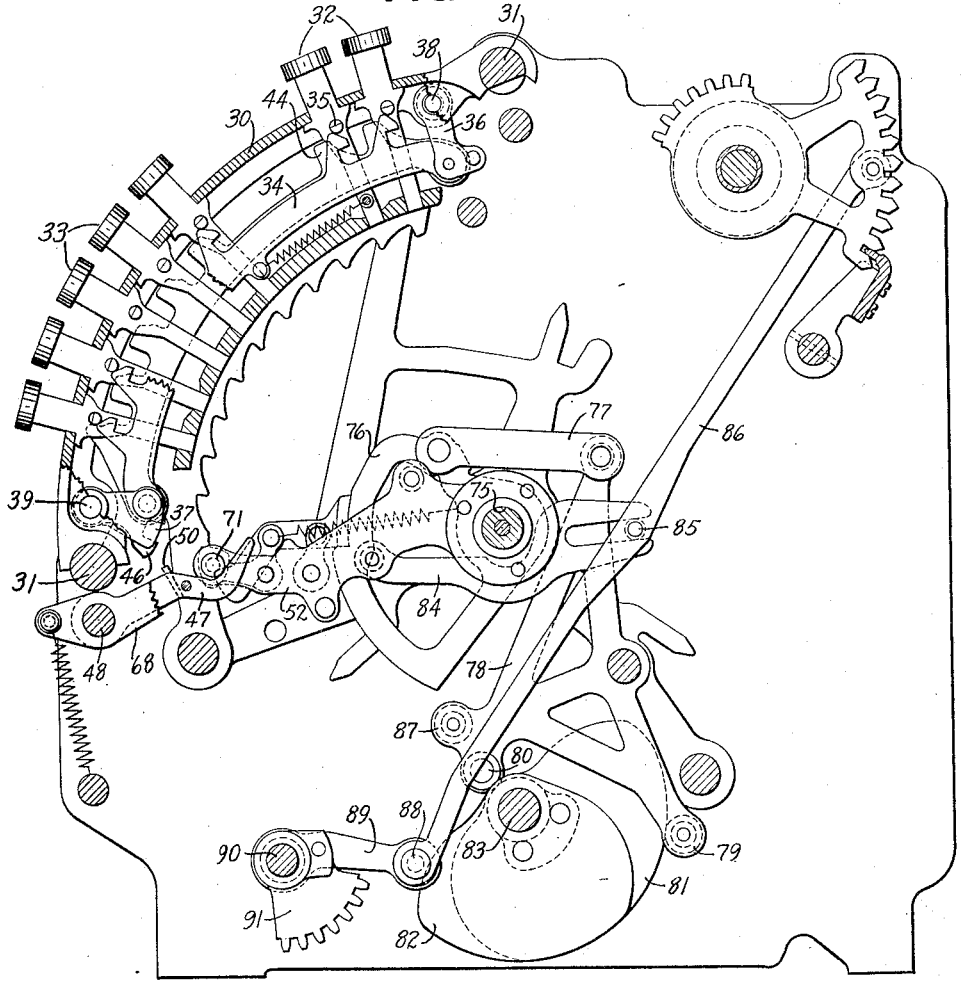
Fig. 1 is a transverse sectional view of the machine showing the transaction key bank and its cooperating mechanism.

The transaction keys comprise two groups arranged in a single bank and mounted in a common frame 30 (Fig. 1) supported by the rods 31 extending between the side frames (not shown) of the machine. The upper group of keys 32 is used in registering multiple item transactions and the lower group of keys 33 is used in registering single item transactions.

The keys are held in their normal positions by the usual springs (not shown) and when depressed are retained in their depressed positions by a spring-actuated locking detent bar 34, engaging pins 35 on the keys.

The detent bar 34 is pivotally mounted on links 36 and 37, which swing on pins 38 and 39, respectively.

The key pins 35, when the keys are depressed also wipe against the beveled walls of recesses formed on a movable setting bar 44, to shift the bar and operate interlocking mechanism between the transaction keys and a starting key (not shown). The setting bar 44 is pivotally supported by links 45 and 46 (Fig. 2) also pivoted on the pins 38 and 39.

Any of the "single item" keys 33, when depressed, contacts its key pin 35 against the inclined end of the usual detaining hook on the detent bar 34 to shift the bar and hook against the tension of the usual restoring spring, so that after the pin 35 passes below the bill of the hook, the spring will return the detent bar to latch the hook over the pin and retain the key 33 in depressed position. Depression of another key 33 will release the key first depressed in the well-known manner.

The pin 35 of the "single item" key 33, when the latter is depressed, will also contact the beveled wall of that recess in the movable setting bar 44 which lies in the path of the pin, to shift the setting bar and operate interlocking mechanism (not shown), the hook of the detent bar 34, by retaining the key in depressed position, also causes the key through its pin 35 to retain the setting bar 44 in shifted position.

In entering a multiple item transaction, the operated transaction key 32 should be locked in depressed position, and all other transaction keys locked against depression, until the completion of the entire transaction.

This result may be conveniently obtained by arranging the inclined walls of those recesses in the setting bar 44 which lie beneath the "multiple item" keys 32, so that upon depression of a key 32, the setting bar is given a greater extent of movement than is imparted to it by the "single item" keys 33, and by providing the link 46, to which the lower end of the setting bar 44 is pivoted, with a notch 51 (Fig. 2) engageable by a locking bail 50 journaled on a release shaft 48.

When a "single item" key 33 is depressed, the setting bar 44 is not shifted a sufficient distance to swing the notched link 46 far enough to bring the notch 51 into the path of the locking bail 50. But, owing to the longer incline of the walls of the notches in the setting bar 44 beneath the "multiple item" keys 32, depression of a multiple item key will shift the setting bar 44 and its link 46 to such an extent that upon complete depression of the key and the restoration of the detent bar 34 and its link 37 to locking position, the notch 51 in link 46 is in the path of the locking bail 50 preparatory to the entry of the edge of the locking bail 50 thereinto.

An arm 47 pivoted on the release shaft 48 is fast with the locking bail 50 to control the latter. The inner free end of the bail arm 47 extends inwardly into the path of a stud 71 projecting from the usual differentially movable arm 52, which stud maintains the bail arm 47 and the locking bail 50 in idle position against the tension of a spring connected with the arm 47 which tends to rock the arm 47 and locking bail 50 counterclockwise towards the link 46.

Depression of an item key, and amount keys, followed by an operation of the machine, rocks the differential arm 52 clockwise, in the well known manner, to select the proper totalizer, and in so doing the differential arm 52 releases the bail-carrying arm 47 to the action of its spring, which rocks the arm 47 and its locking bail 50 counter-clockwise, and the bail then enters the notch to hold the depressed "multiple item" key 32 in its depressed position throughout two or more operations of the machine.

And the extended travel permitted the locking bail 50 when it enters the notch 51 in the link 46, positions the bail beneath the link 37 to thereby lock all the other keys in the item bank against depression.

When a "single item" key 33 is depressed, and the machine is operated, the limited travel permitted the locking bail 50 is such that the free end of the bail arm 47 remains in the path of the stud 71 when the bail contacts the unnotched end of the link 46, so that upon the return of the differential arm 52 at the end of the operation, the stud 71 contacts the bail arm 47 and restores it together with the bail 50, to idle position. But when a "multiple item" key 32 is depressed, and the machine operated, the extended travel of the bail 50 withdraws the free end of the arm 47 from the path of the stud 71 on the differential arm 52.

Therefore, to effect the release of the item keys 32 and 33, and the restoration of the locking bail 50 to its idle position, I provide the usual total lever 53 (Fig. 5) with a cam slot 54. After all the items of a multiple item transaction have been entered in the machine, the total lever 53 is manually shifted from its normal "add" position to the "item total" position, and after the total is printed, the total lever is restored to its normal "add" position. A roll carried on one arm of a lever 55 pivoted at 56, enters the cam slot 54, the opposite arm 57 of the lever having formed on one edge thereof a cam recess 43. A link 58 also pivoted at 56 and overlying the arm 57 of the lever 55, has a complementary cam recess 43 formed in its edge, which cooperates with the cam recess formed in the arm 57 of lever 55 to constitute a cam slot. A spring 93 connects a stud 94 on the link 58 with the arm 57 of the lever 55 to hold these parts together with the stud 94 in contact with the upper end of the arm 57. This arrangement provides a flexible cam mechanism which will yield to prevent injury to the machine in case the release shaft 48 is locked by a depressed key, at the time the total lever 53 is shifted from its "add" position. A crank 92 fast on the release shaft 48 on which the bail-carrying arm 47 is pivoted, carries a roll 59 entered in the cam slot 43 formed by the complementary edges of the arm 57 of lever 55, and the link 58.

When the total lever 53 is adjusted from its "add" position to its "item total" position, its cam slot 54 rocks the lever 55 in counter-clockwise direction, and the arm 57 of the lever 55 together with the link 58, rocks the crank 92 and release shaft 48 in clockwise direction.

A tappet 95 (Fig. 2) fast on the release shaft 48 is thereby rocked to contact the stud 96 connected with the bail lever 47.

As is customary in machines of the type to which this invention is applied, a total-taking operation includes two cycles of rotation of the main drive shaft 83 of the machine during the latter part of the first of which cycles, the release shaft 48 is rotated slightly farther in clockwise direction (by means not herein shown) which presses the tappet 95 against the stud 96 to rock the bail arm 47 clockwise sufficiently to return the free end of the bail arm into the path of the stud 71 on the differential arm 52 while the latter is at a point some distance above the bail arm 47, so that as the differential arm 52 is restored, its stud 71 strikes the free end of the bail arm 47 and withdraws the locking bail 50 from engagement with the notch in the link 46 to permit the release of the depressed "multiple item" key 32.

The foregoing mechanism is more fully explained in the co-pending application of Shipley, Serial No. 687,305, above referred to, and constitutes a part of the present invention now to be set forth, only in so far as it cooperates therewith to attain the objects heretofore stated.

The bail arm 47 (Figs. 2 and 4) has secured thereto an arm 68, carrying a roll 67 projecting into a cam slot 66 formed in a locking plate 63 pivotally mounted at 64 on the usual differential hanger 65. Normally, the roll 67 lies near the inner end of the slot 66, as shown in Fig. 2. When a "multiple item" key 32 is depressed and the machine is operated, however, the locking bail 50 enters the notch 51 in the link 46, as above described, and simultaneously, the arm 68 swings clockwise to position the roll 67 near the outer end of the cam slot 66, as shown in Fig. 4. As the roll traverses the cam slot, it rocks the plate 63 in counter-clockwise direction to shift a lateral lip 62 formed on the pivoted locking plate 63 into an elongated notch or recess 61, in a block 60, riveted to the side of the total lever 53 to limit the travel of the total lever. The notch 61 is just long enough to permit movement of the total lever 53 from its "add" position to the "multiple item" total position, but no farther, because the lever is arrested in this position by the contact of the upper wall of the notch 61 in the block 60 with the lip 62. Thus it is seen, that so long as the locking bail 50 lies in the notch 51 of the link 46, the lip 62 of the pivoted locking plate 63 prevents adjustment of the total lever 53 to any "total" position except the "multiple item total" position.

The above described mechanism compels the taking of the total of a "multiple item" transaction and the resetting of the totalizer to zero before proceeding with another transaction.

The lip 62 and block 60 also provide a convenient stop for the total lever 53, and permits speeding up the operation of the machine. If, for example, it is desired to print the total of the "multiple item" transaction, all the operator need do is shift the total lever 53 down until it is arrested by the contact of the upper end of the recess 61 with the lip 62, without paying any attention to where the lever is to be adjusted. The lip 62 arrests the total lever 53 in the proper position for printing the total of a "multiple item" transaction, and the arm 68 and stud 67 hold the locking plate 63 against yielding under the force of contact of the end wall of the recess 61 with the lip 62.

During total taking operations, the locking bail 50 is withdrawn from the notch 51 in link 46, by the stud 71 carried by the differential member 52, as heretofore explained, thus rocking the arm 68, clockwise as viewed in Fig. 2, and counter-clockwise as viewed in Fig. 4 to cause the roll 67 to return towards the inner end of the cam slot 66 in locking plate 63. This movement of the roll 67 rocks the locking plate 63 clockwise (Fig. 4) to withdraw the lip 62 from the notch 61 in the block 60, to release the total lever 53 for adjustment to any desired position. A pin 69 lies in the path of an extension 70 and limits the clockwise movement of the pivoted locking plate 63.

*Differential mechanism*

The differential mechanism which cooperates with the transaction keys 32, 33 is of the regular construction, and therefore, it will be but briefly described herein.

The differential arm 52 (Fig. 1) is pivoted on the stud 75 supported in the differential hanger. This arm carries the usual latch to connect the differential arm 52 to a driving segment 76, which is of the regular construction and fully described in the patents and application previously referred to. The driving segment 76 is operated by mechanism which comprises a link 77, and a lever 78 carrying rollers 79 and 80 cooperating with cams 81 and 82 fixed on a driving shaft 83. To the differential arm 52 is pivoted the forward end of the usual beam 84 bifurcated at its rear end to embrace a pin 85 on that transmitting link 86 which is associated with the transaction bank. The beam 84 is operated in the usual way by the differential arm 52 and a roller 87 on the operating lever 78 which at times contacts the lower edge of said beam. The transmitting link 86 is connected at its upper end to the indicator-actuating mechanism, and at its lower end to a stud 88 carried by an arm 89, pivoted on a cross shaft 90, and secured to a gear segment 91, operatively connected to a type carrier (not shown) in the printing mechanism.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, a multiple item key, means for retaining said key in depressed position, a manipulative total control means having an "add" position, a "multiple item total-taking" position, and other total-taking positions, and means for preventing movement of said manipulative total control means into said other total-taking positions after said key is depressed.

2. In a machine of the class described, a plurality of keys, means for retaining any of said keys in depressed position, a manipulative control means having an adding position and a plurality of total-taking positions, a recessed device on the total control means, and pivoted means mounted on a rigid frame to cooperate with said recessed device to compel an operation of the machine with the total lever in a total-taking position corresponding to the particular key depressed.

3. In a machine of the class described, the combination of a "single item" key, a "multiple item" key, means for retaining said keys in depressed position, a manipulative total control means having an "add" position and a plurality of total-taking positions, means for locking said retaining means during an operation in which said "multiple item" key is depressed, and means operated during an "add" operation with said "multiple item" key depressed, for preventing movement of said total control means to any other than a total-taking position corresponding to said "multiple item" key.

4. In a machine of the class described, a key, a total control lever having an "add" position and a plurality of total-taking control positions, one of which corresponds to said key, a block fastened to said lever and provided with a notch of a length equal to the distance from the "add" position to the total-taking control position which corresponds to said key, said position being adjacent to said "add" position, and means controlled by the key to enter the notch, and limit the throw of the total control lever.

5. In a machine of the class described, a key, a total control lever having an "add" position and a plurality of total-taking control positions, one of which corresponds to said key, a block fastened to said lever and provided with a notch of a length equal to the distance from the "add" position to the total-taking control position which corresponds to said key, a member pivoted on a stationary part of the machine and provided with a lug adapted to cooperate with the notch in said plate, and means operated during an operation of the machine with said key depressed to rock said member and enter its lug into said notch.

6. In a machine of the class described, a key, a retaining means therefor, a lock for the retaining means, a differential controlled by said key and adapted, in its movement from home position, to permit said lock to move into effective position, the construction being such that the lock in its full locking position is out of the path of the differential, a total lever having an "add" position and a plurality of total-taking positions, one of which corresponds to said key, means operated by said lock as it moves into effective position, to prevent the movement of said lever into any other than the total-taking position corresponding to said key, and means operated by the total control lever as it is moved into a total-taking position for causing said lock and said preventing means to be moved into their ineffective positions as the differential returns into its home position, to permit the total control lever to be shifted into any of its several positions.

In testimony whereof I affix my signature.

BERNIS M. SHIPLEY.